United States Patent [19]

Kanaoka et al.

[11] Patent Number: 4,554,560
[45] Date of Patent: Nov. 19, 1985

[54] SIDE PRINTING APPARATUS

[75] Inventors: Takeshi Kanaoka; Shigehisa Shimizu, both of Kanagawa, Japan

[73] Assignee: Fuji Photo Film Co., Ltd., Kanagawa, Japan

[21] Appl. No.: 554,115

[22] Filed: Nov. 21, 1983

[30] Foreign Application Priority Data

Nov. 25, 1982 [JP] Japan ................. 57-206520

[51] Int. Cl.⁴ .................. G01D 9/42; G03B 17/24
[52] U.S. Cl. .................................... 346/108; 354/105
[58] Field of Search ............... 346/108, 109; 354/105–109

[56] References Cited

U.S. PATENT DOCUMENTS

| | | | |
|---|---|---|---|
| 3,256,524 | 6/1966 | Stauffer | 346/109 X |
| 4,245,228 | 1/1981 | Cook | 346/108 |
| 4,308,544 | 12/1981 | Lucero et al. | 346/108 |
| 4,504,130 | 3/1985 | Bell et al. | 346/108 X |

FOREIGN PATENT DOCUMENTS 53-76929  6/1978  Japan.
56-16589  4/1981  Japan.
56-38341  4/1981  Japan.

Primary Examiner—George H. Miller, Jr.
Attorney, Agent, or Firm—Young & Thompson

[57] ABSTRACT

A side printing apparatus for providing latent images of information marks, such as manufacturer's name, date information, film size, frame numbers and the like at the longitudinal sides adjacent each picture frame of a photosensitive product, is adapted to scan the surface of the photosensitive product moving with continuous motion with a deflecting device which deflects a beam of laser light in a direction perpendicular to the direction of the continuous motion of the photosensitive product. Before the deflection, the beam of laser light is modulated according to the pattern of marks by which the latent image is required to be provided on the photosensitive material.

6 Claims, 4 Drawing Figures

SIDE PRINTING APPARATUS

BACKGROUND OF THE INVENTION

The present invention relates to a printing apparatus by which a photosensitive product is provided with latent images of characters, numerals, symbols' marks or the like during the manufacture of the photographic product.

In the manufacture of photosensitve products such as photographic film, paper or the like (which is herein generically referred to as a "film"), it is usual to provide a film with latent images of characters, numerals, symbols, marks the like (which are herein generically referred to as "characters") which are later photographically developed during the processing of the exposed film, for providing information marks such as manufacturer's name, date information, film type, frame numbers, frame size and the like along the longitudinal sides or margins of the film. One way of so marking a film, which is generally called side printing, is to optically form light images of characters on the film at the longitudinal margins adjacent each picture frame during the film manufacture, the film being thereby produced with latent images of characters; and which characters are later photographically developed during the processing of the exposed film. Apparatus for producing a film with such latent images of characters as aforementioned, which are generally called side printing apparatus, are well-known as indicated by Japanese utility model No. 16589/1981, Japanese patent unexamined publication Nos. 42037/1982 and 163226/1982 and Japanese utility model unexamined publication No. 38341/1981. Such apparatus are divided into four types in accordance with their forms of light image providing arrangement. One form is a projection arrangement in which a character pattern plate and a light source for illuminating the pattern plate are used to form light images of characters, another is a light emitting diode (LED) matrix array in which a plurality of LEDs are selectively energized to form light images of characters, the third is a liquid crystal display device in combination with a light source, and the fourth is a cathode ray tube (CRT) display device.

The first arrangement aforementioned is considered to have an operational weak point in that it takes considerable time to move the character pattern plate into the required position so as to optically align the character pattern which is required to be printed with the location at which the film is printed with the latent image of the required character. Because of this, the apparatus including the first arrangement is unsuitable for high speed printing and is restricted to characters which are formed in the pattern plate. In the LED matrix array, there is the shortcoming that it is difficult to obtain a printed character of uniform density owing to the scattered luminosities and light distributions of LEDs used. Furthermore, although the CRT display device permits displaying easily any character thereon, the problems of residual images and slow response remain. A common fault observed in individual arrangements is that printing clearly a fine line is difficult. As a result, it is hard to print precisely charcters of small size or a bar code comprising heavy and fine lines in combination. Another common fault is that such arrangements are not suitable for high speed printing.

SUMMARY OF THE INVENTION

It is therefore a primary object of the present invention to provide a side printing apparatus which can precisely provide the longitudinal margins of a film with latent images of characters comprising fine lines.

It is another object of the present invention to provide a side printing apparatus which is suitable for providing the longitudinal margins of a film with latent images of characters at a high speed.

It is further object of the present invention to provide a side printing apparatus which can provide a film with latent images of characters which are uniform in density when later photographically developed.

It is a still further object of the present invention to provide a side printing apparatus which can provide the longitudinal margins of a film with latent images of a bar code comprising heavy and fine lines which are arranged precisely and have a good resolution when later photographically developed.

For accomplishing these and other objects, the invention proposes an apparatus, useful in the manufacture of a photosensitive product, such as a long web of film, paper or the like (which is herein referred to as a "film"), for providing latent images of characters, numerals' symbols and the like (which are herein generically referred to as "characters") along the longitudinal margins of such film, which apparatus is characterized in that a beam of laser light having a high energy density and a good directivity is modulated by a light modulator, and that the modulated beam of laser light is deflected by a deflecting means such as a rotatable polygonal mirror, angularly rotatable mirrors or the like so as to scan the surface of the film for the provision of latent images of characters along the margins adjacent each picture frame of the film.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE INVENTION

Figure 1:
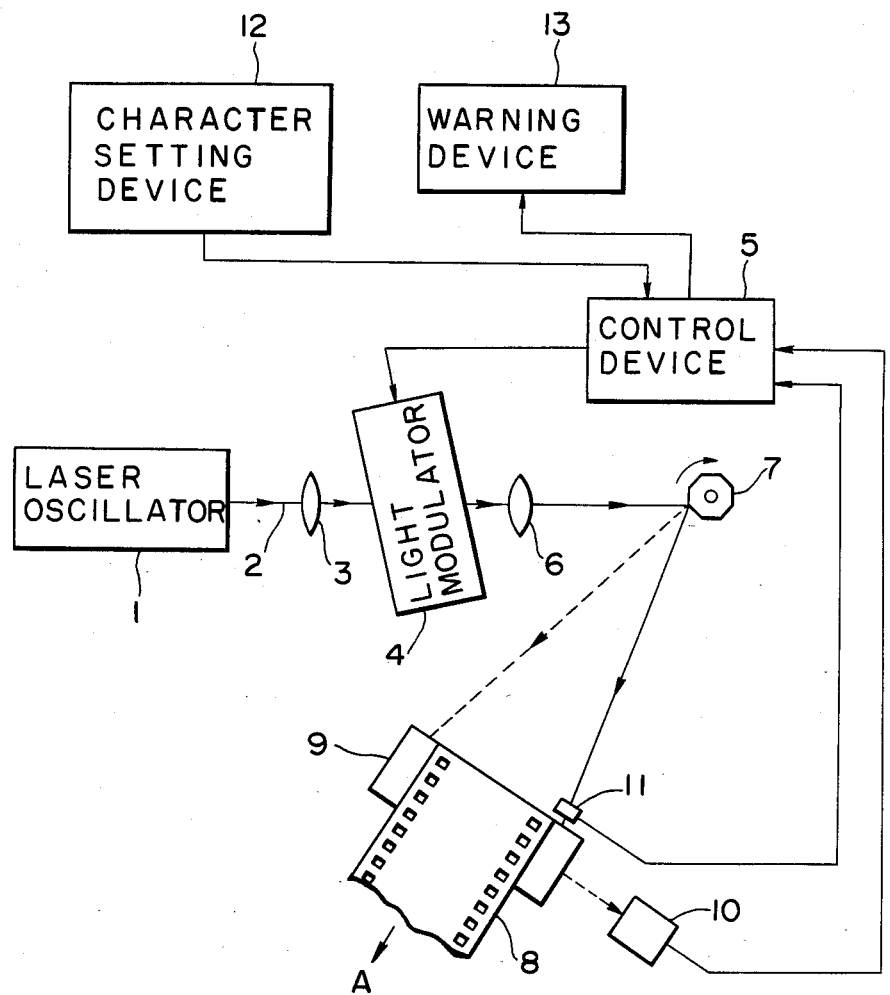
FIG. 1 is a schematic view showing the principal constructions of a side printing apparatus of one embodiment of the present invention.

Preferred embodiments of the present invention will be now described with reference to the drawings. As shown in FIG. 1 which shows the basic consruction of the apparatus of an embodiment of the present invention, a parallel beam 2 of laser light having a high energy density and a good coherency which is emitted from a laser osillator 1 is passed through a converging lens for reducing the cross-section and is directed to a light modulator 4 which, in turn, operates as an optical switch to permit the beam 2 of laser light to travel toward another converging lens 6 only upon receiving pulse signals from a control device 5 which will be described later herein. It is preferable to utilize an acoustic optical element as the modulator 4, which acoustic optical element has the characteristic of varying the refractive index thereof by longitudinal ultrasonic waves propagated therein in a direction perpendicular to the path of the beam 2 of laser light so as to modify the path by refraction or diffraction.

The beam 2 of laser light passed through the converging lens 6 is incident on a light deflecting means, i.e., rotating polygonal mirror 7 in this embodiment, and is reflected by the mirror surface of the polygonal mirror 7. The beam of laser light is then angularly deflected by the rotation of the polygonal mirror 7, that is, this beam 2 of laser light which is converged as a light spot on a film 8 travels in the direction perpendicular to the direction A in which the film moves with continuous motion and thereby scans in a line on the film 8. Although, in this embodiment shown in FIG. 1, a polygonal mirror is utilized as the deflecting means, it is possible to utilize galvanic mirrors, other light deflecting means operated with, for instance, ultrasonic waves or magnetism, and the like.

A rotatable drum 9 which holds the film in close contact with the peripheral surface thereof in the converging plane of the converging lens 6 is adapted to rotate as a result of the continuous motion of the film 8 in the direction shown by the arrow A. A detector 10 which is operationally associated with the drum 9 is provided for the purpose of detecting the length of the film 8 moved, which detector may take the form of pulse generator, resolver, perforation counter or the like. Located near the rotatable drum 9 is a light sensing means 11 which, in turn, receives the beam 2 of laser light from the polygonal mirror 7 and, at the commencement of a scanning cycle by the light spot for each line, provides a start signal which, in turn, is directed to a controller 5 mentioned later. The controller 5 operates to control the film motion and rotation of the polygonal mirror in such a way that a fixed relationship between signals from the detector 10 and light sensing means 11 is maintained for the scanning operation in synchronism with the film motion, i.e., the line scanning at regular pitch is assured. Shown at 12 is a character setting device for the entry of required informational characters onto the film 8.

The controller 5 aforementioned, taking the form of computer, includes a character-generator well-known per se in which pattern data of characters are stored. The pattern signals for the character specified through the pattern setting device 12 which are retrieved each scanning line in synchronism with the receipt of signals from the detector 10 and light sensing means 11, operate to controllably cause the modulator 4 to produce a modulated beam of laser light, this modulated beam of laser light passing through the converging lens 6 and then being incident on the surface of the polygonal mirror 7. The modulated beam of laser light is reflected and thereby repeatedly deflected by the continuous rotation of the polygonal mirror 7 in the transverse direction of the film 8 moving in continuous motion. Consequently, the modulated converged beam of laser light, i.e., laser light spot displays a scanning pattern of two-dimensions on the film 8, resulting in providing the film with a latent image of a required informational character. For a reason which will become apparent hereinafter, the controller 5 is provided with a comparator (not shown) for comparing the output level of the signal from the light sensing means with a predetermined signal level. The comparator is adapted to provide a signal which operates to cause a warning device 13 for giving a warning to indicate that the oscillator 1 is abnormal, upon receiving a low output level of the signal from the light sensing means 11, that is, a signal level less than the predetermined level. The low output signal level from the light sensing means 11 shows that laser light from the oscillator 1 is too faint for a satisfactory film exposure and that the oscillator 1 has behaved unusually or is out of order. The warning may be made by emitting a sound or light in a well-known manner. It should be noted that it is desirable to provide the pattern setting device 12 with film sensitivity setting means, for instance selectively operable push buttons, for controlling the modulator 4 to vary the amount of laser light passing therethrough for the proper exposure of film.

Figure 2:
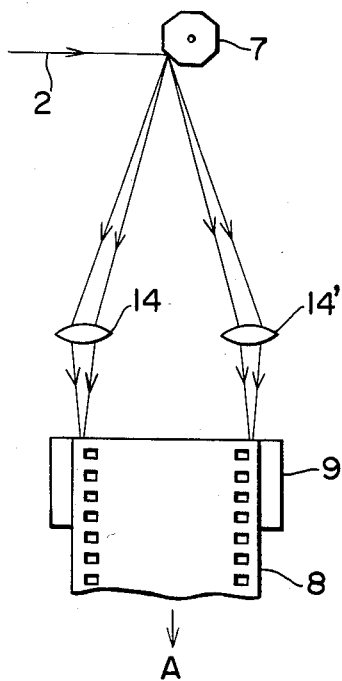
FIG. 2 is a front view showing an essential portion of a side printing apparatus of another embodiment of the present invention wherein a converging lens is disposed between a beam deflecting mirror and a film.

In FIG. 2 showing a side printing apparatus of another embodiment of the present invention, there is provided focusing lenses 14 and 14' between the polygonal mirror 7 and rotatable drum 9 for the purposes of scanning only defined margins of the film and of developing the resolution of images.

Figure 3:
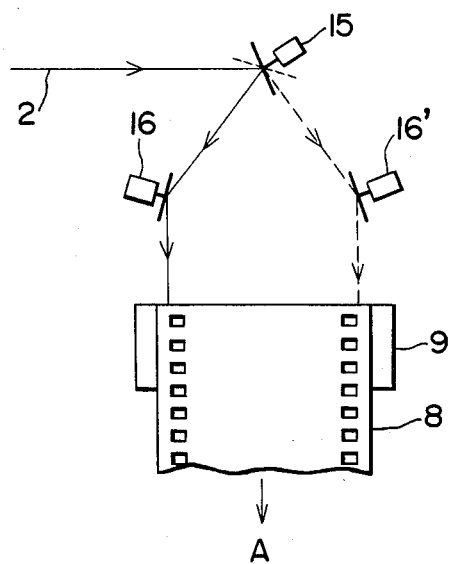
FIG. 3 is a front view showing an essential portion of a side printing apparatus of a further embodiment of the present invention wherein galvanic mirrors are used as a beam deflecting means.

Referring to FIG. 3 showing a side printing apparatus of a further embodiment of the present invention, there are provided galvanic mirrors 15, 16 and 16' in place of the polygonal mirror 7 in the embodiment shown Figs. 1 and 2, the first 15 is used to diflect the beam of laser light incident thereonto and the others 16 and 16' are adapted to scan the margins of the film 8 with the light spot for providing latent images of characters thereon. This embodiment results in the scanning of defined margins of the film and the developed resolution of images as is similar to the embodiment of FIG. 2.

Figure 4:
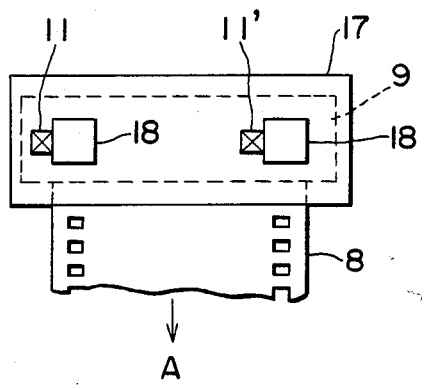
FIG. 4 is a plan view showing a portion of a side printing apparatus of a still further embodiment of the present invention wherein a mask plate is disposed over a film on which latent images of characters are provided at opposite sides thereof.

In FIG. 4 showing a side printing apparatus of a still further embodiment of the present invention, there is disposed a mask plate 17 with openings at its opposite ends above the rotatable drum 9, each opening being configured to allow the beam of laser light to scan only the margin of the film where latent images of characters are to be provided, i.e., the remainder of the film is never exposed to the beam of laser light. Furthermore, in this embodiment, there is provided a light sensing means 11, 11' adjacent each aperture 18, 18' for the purpose of precisely locating latent images on the film.

Although the present invention has been described by way of example with reference to latent images of characters, numerals, symbols and the like that are provided between the longitudinal edge and a row of perforations of a long web of film moving in continuous longitudinal motion, it is applicable to provide latent images of characters, numerals, symbols and the like on disk-type film units which move separately in continuous rotational motion. Furthermore this invention is applicable not only to the processes of film manufacture, providing a film with identifying data, such as the owner of the film and the like before the usual processing of the exposed film, but also to the process of providing papers with classifying and identifying data, such as the name of customer, and time information, print type, the number of prints and the like in a laboratory. It will be apparent to those skilled in the art from the foregoing description of the present invention that various improvements and modifications can be made in it without departing from its scope. The embodiments described herein are merely illustrative and should not be viewed as the only embodiments that the present invention might encompass.

What is claimed is:

1. A side printing apparatus for providing latent images of characters, numerals, symbols and the like on a photosensitive product moving with continuous motion, said apparatus comprising:
   an oscillator for emitting a beam of laser light;
   means for modulating said beam of laser light upon passing therethrough;
   means for deflecting said modulated beam of laser light in accordance with the angular disposition thereof so as to scan the surface of a photosensitive product in a direction perpendicular to that in which said photosensitive product moves with continuous motion;
   means for selectively setting patterns of characters, numerals, symbols and the like, of which the latent images are required to be provided on said photosensitive product and simultaneously producing signals in accordance with said patterns selectively set;
   means driven by said product for detecting a moved length of said photosensitive product and to produce corresponding signals; and
   means for controlling said modulating means by said signals from said pattern setting means and said detecting means so as to provide said required latent images on said photosensitive product at predetermined locations.

2. Apparatus as claimed in claim 1, said means driven by said product comprising a drum about which the product passes in close contact, the continuous motion of said product rotating said drum to actuate said detector.

3. A side printing apparatus for providing latent images of characters, numerals, symbols and the like on a photosensitive product moving with continuous motion, said apparatus comprising:
   an oscillator for emitting a beam of laser light;
   means for modulating said beam of laser light upon passing therethrough;
   means for deflecting said modulated beam of laser light in accordance with the angular disposition thereof so as to scan the surface of a photosensitve product in a direction perpendicular to that in which said photosensitive product moves with continuous motion;
   means for selectively setting patterns of characters, numerals, symbols and the like, of which the latent images are required to be provided on said photosensitive product and simultaneously producing signals in accordance with said patterns selectively set;
   means for detecting a moved length of said photosensitive product and to produce corresponding signals;
   means for controlling said modulating means by said signals from said pattern setting means and said detecting means so as to provide said required latent images on said photosensitive product at predetermined locations; and
   light sensing means operatively associated with a warning device to give a warning to indicate that said light sensing means is receiving light from said beam of laser light at an intensity lower than a predetermined level of intensity.

4. A side printing apparatus for providing latent images of characters, numerals, symbols and the like on a photosensitive product moving with continuous motion, said apparatus comprising:
   an oscillator for emitting a beam of laser light;
   means for modulating said beam of laser light upon passing therethrough;
   means for deflecting said modulated beam of laser light in accordance with the angular disposition thereof so as to scan the surface of a photosensitive product in a direction perpendicular to that in which said photosensitive product moves with continuous motion;
   means for selectively setting patterns of characters, numerals, symbols and the like, of which the latent images are required to be provided on said photosensitive product and simultaneously producing signals in accordance with said patterns selectively set;
   means for detecting a moved length of said photosensitive product and to produce corresponding signals;
   means for controlling said modulating means by said signals from said pattern setting means and said detecting means so as to provide said required latent images on said photosensitive product at predetermined locations; and
   two focusing lenses after said deflecting means each being disposed above a side portion of said photosensitive product.

5. A side printing apparatus for providing latent images of characters, numerals, symbols and the like on a photosensitive product moving with continuous motion, said apparatus comprising:
   an oscillator for emitting a beam of laser light;
   means for modulating said beam of laser light upon passing therethrough;
   means for deflecting said modulated beam of laser light in accordance with the angular disposition thereof so as to scan the surface of a photosensitive product in a direction perpendicular to that in which said photosensitive product moves with continuous motion;
   means for selectively setting patterns of characters, numerals, symbols and the like, of which the latent images are required to be provided on said photosensitive product and simultaneously producing signals in accordance with said patterns selectively set;
   means for detecting a moved length of said photosensitive product and to produce corresponding signals;
   means for controlling said modulating means by said signals from said pattern setting means and said detecting means so as to provide said required latent images on said photosensitive product at predetermined locations;
   said deflecting means comprising three angularly rotatable galvanic mirrors, the first one of which deflects said modulated beam of laser light repeatedly alternately toward the other two, each mirror being disposed above a side portion of said photosensitive product for transversely scanning said side portion.

6. A side printing apparatus for providing latent images of characters, numerals, symbols and the like on a photosensitive product moving with continuous motion, said apparatus comprising:
- an oscillator for emitting a beam of laser light;
- means for modulating said beam of laser light upon passing therethrough;
- means for deflecting said modulated beam of laser light in accordance with the angular disposition thereof so as to scan the surface of a photosensitive product in a direction perpendicular to that in which said photosensitive product moves with continuous motion;
- means for selectively setting patterns of characters, numerals, symbols and the like, of which the latent images are required to be provided on said photosensitive product and simultaneously producing signals in accordance with said patterns selectively set;
- means for detecting a moved length of said photosensitive product and to produce corresponding signals;
- means for controlling said modulating means by said signals from said pattern setting means and said detecting means so as to provide said required latent images on said photosensitive product at predetermined locations; and
- a mask plate with openings at opposite sides thereof disposed above said product, said openings being configured to allow the beam of laser light to strike only the margins of said product.

* * * * *